July 22, 1924.
J. W. SHEPARD
ROD PACKING
Filed July 23, 1920
1,501,927
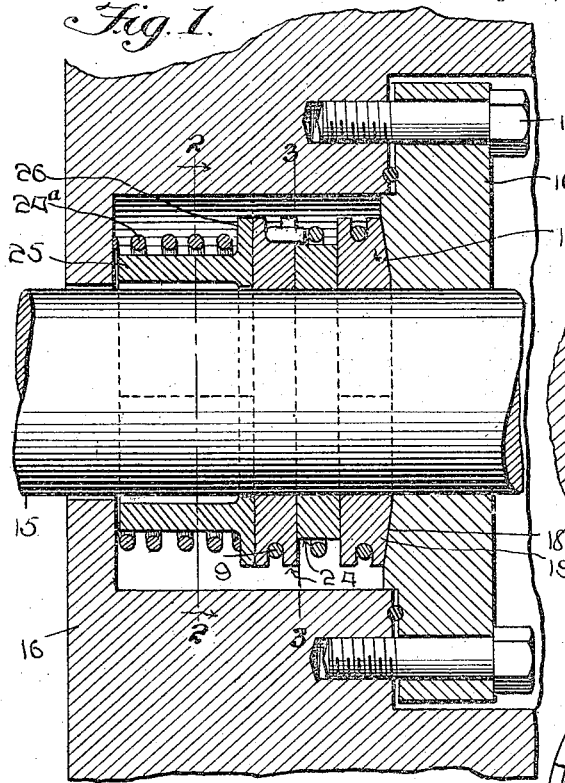
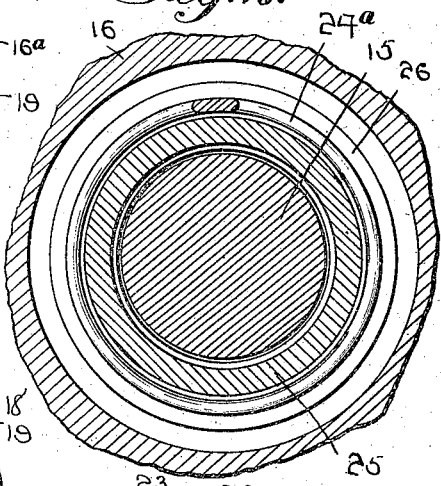
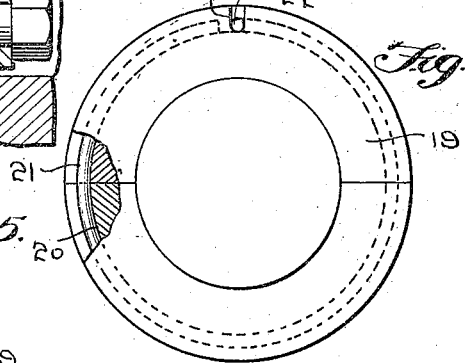
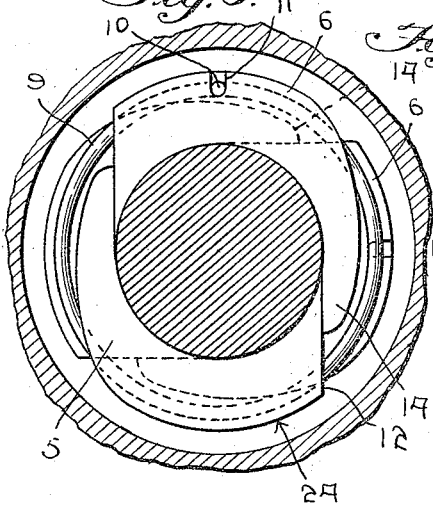
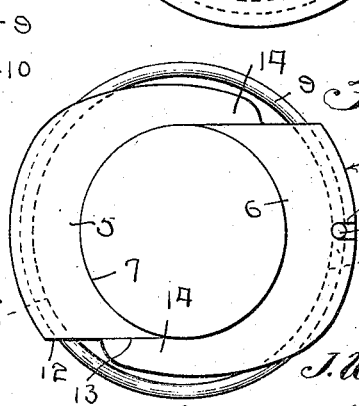
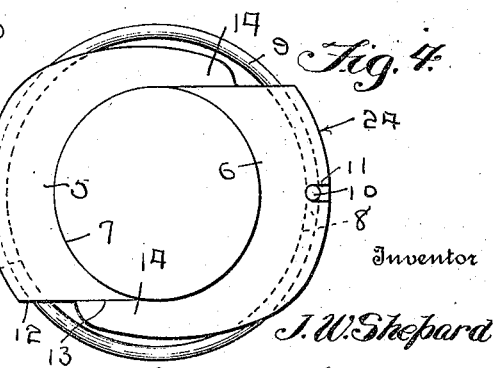
Inventor
J. W. Shepard
By Geo. T. Kimmel
Attorney
Witness
J. L. Wright Patented July 22, 1924.

1,501,927

UNITED STATES PATENT OFFICE.

JOHN W. SHEPARD, OF TUCSON, ARIZONA.

ROD PACKING.

Application filed July 23, 1920. Serial No. 398,514.

*To all whom it may concern:*

Be it known that I, JOHN W. SHEPARD, a citizen of the United States, residing at Tucson, in the county of Pima and State of Arizona, have invented certain new and useful Improvements in Rod Packings, of which the following is a specification.

This invention relates to improvements in rod packings and has for its object to provide a simple and effective packing especially designed for use in connection with the piston rods of modern types of high pressure steam engines.

A further object is the provision of a packing embodying an improved type of segmental ring, the segments of which embrace the rod and are yieldably maintained in position thereon by a contractile spring ring.

A further object resides in the provision of means for maintaining the several rings composing the packing in snug contacting relation to prevent the escape of steam therebetween.

With these and other objects in view, the invention consists in certain novel features of construction as hereinafter shown and described and then specifically pointed out in the claims and in the drawings illustrative of the preferred embodiment of the invention.

In the accompanying drawings:

Figure 1 represents a fragmental sectional view through one of the heads of a steam engine cylinder disclosing the arrangement of the improved packing about the piston rod.

Fig. 2 represents a transverse sectional view on the line 2—2 of Fig. 1.

Fig. 3 represents a transverse sectional view in the plane of the line 3—3 of Fig. 1.

Fig. 4 represents a front elevation of one of the segmental packing rings and its retaining spring detached from the rod.

Fig. 5 represents an edge elevation of the retaining spring detached from the ring, and, Fig. 6 represents a front elevation, partly in section, of another of the rings of the packing detached.

Referring to the drawing in detail, wherein similar reference numerals designate corresponding parts throughout the several views, the numerals 5 and 6 designate the companion segments forming each packing ring. The inner edge of each segment is of substantially semi-circular form as indicated at 7, so that when the segments are properly assembled a circular opening is provided therethrough for accommodating the rod. The relatively thick body portions of each of the segments are formed with a circumferential groove 8 on its outer edge, receiving a circular contractile spring 9, which latter is of the split type and is provided with one laterally projecting end 10, engaged in a slot 11, formed in one side wall of the groove 8, of the segment 6. The spring 9, encircles the segments 5, 6, that is to say the relatively thick body portions of said segments, as well as projecting outwardly with respect to the remaining portions, to be hereinafter referred to, and termed fingers, of the segments.

Except for the formation of the slot 11, in one of the segments, said segments are identical in construction and each is provided at one terminal of the body thereof with a flat face 12, engaged by the flat inner surface 13, of a finger 14, carried by the other segment, the bearing faces 12 and 13, between the two segments of each ring being located at diametrically opposed points and disposed in true parallel relation to permit of the segments being moved together to snugly embrace the rod to which they are applied.

Preferably two of the improved packing rings are arranged upon a piston or other rod 15, within a packing box 16, the terminal of which is closed by a cap 16$^a$, secured in position by a plurality of anchoring bolts 17. The inner surface of the cap 16$^a$ is concave as indicated at 18, and engaged by the adjacent convex face of a diametrically split joint ring 19. A circumferential groove 20, is formed in the joint ring 19, and receives a circular contractile split spring 21, having a laterally projecting terminal 22, engaged in a notch 23 formed in one wall of the groove 20, whereby the ring is securely held in position and prevented from accidental displacement. The packing rings designated generally by the numerals 24, are subsequently assembled on the rod 15 inwardly of the joint ring 19, and are normally maintained in contact relation by the tension of an expansion coiled spring 24$^a$ which is arranged about a two-part follower 25 provided with a stop flange 26, at one terminal bearing against the adjacent packing ring 24. By forming the several rings forming the packing in two parts the same may be readily applied to the rod 15, and properly assembled in the packing box 16, behind the cap 16ª, and when so arranged effectively prevent the escape of steam or other fluid about the rod.

As suggested in Fig. 1, the length of the laterally projecting portion 10, of each contractile spring 9, is such as to project through the slot 11, and partially across the finger 14, of the segment of the adjacent ring whereby to limit the relative movement of two of the rings when assembled upon a rod and thus ensure against the joints of the segments of the respective rings moving into alinement with each other.

What I claim is:

1. A packing ring comprising a pair of relatively movable overlapping complemental segments, each of said segments formed with a relatively thick peripherally grooved body having a flat bearing surface at one end and an inwardly directed laterally disposed tapered finger at the opposite end, the lateral finger of one segment having slidable contact with the bearing surface of the other segment, a circular contractile split spring encircling said segments and mounted in the grooves thereof and spaced radially from said fingers, one of said segments provided with a slot extending at right-angles with respect to its groove, and one of the ends of said spring formed with an extension disposed at right-angles with respect to the plane of the spring and positioned in said slot to prevent circumferential shifting of the spring with respect to the segments.

2. A packing ring comprising a pair of relatively movable overlapping complemental segments, each of said segments formed with a relatively thick peripherally grooved body having a flat bearing surface at one end and an inwardly directed laterally disposed tapered finger at the opposite end, the lateral finger of one segment having slidable contact with the bearing surface of the other segment, a circular contractile split spring encircling said segments and mounted in the grooves thereof and spaced radially from said fingers, one of said segments provided with a slot extending at right-angles with respect to its groove, and one of the ends of said spring formed with an extension disposed at right-angles with respect to the plane of the spring and positioned in said slot to prevent circumferential shifting of the spring with respect to the segments, said extension being of sufficient length to project beyond the plane of the segment in which it is mounted to extend over the finger of a segment of an adjacent packing ring.

In testimony whereof, I affix my signature hereto.

JOHN W. SHEPARD.